United States Patent

Niemann et al.

[15] 3,676,780

[45] July 11, 1972

[54] DIGITAL FREQUENCY GENERATOR FOR CODED INTERROGATION

[72] Inventors: George W. Niemann; Charles N. Shannon, both of Dallas, Tex.

[73] Assignee: The United States of America as represented by the Secretary of the Navy

[22] Filed: June 9, 1966

[21] Appl. No.: 556,836

[52] U.S. Cl. ....................325/155, 325/55, 325/113, 340/2

[51] Int. Cl. ....................H04b 1/02

[58] Field of Search ....................340/345, 365; 331/49; 328/61, 328/63; 343/6.5 SS; 325/155

[56] References Cited

UNITED STATES PATENTS 2,701,279 2/1955 Lovell et al. ....................340/351

2,910,579 10/1959 Jones et al. ....................343/6.5 SS 3,226,648 12/1965 Davidson ....................331/49 X

*Primary Examiner*—Benjamin A. Borchelt
*Assistant Examiner*—H. A. Birmiel
*Attorney*—G. J. Rubens and Henry Hansen

[57] ABSTRACT

A command control sonobuoy system is provided in which a large number of buoys are commanded on a single frequency from a remote position. A single radio frequency carrier signal is modulated with selected two tone signals from a plurality of discrete tones derived from digital elements upon the receipt of instructions from an operator or a computer. In operation, a generate provides a plurality of signals of different frequency in response to the receipt of a coded address signal. The signals of different frequency are then combined to provide a modulated signal for application to a transmitter.

14 Claims, 5 Drawing Figures

INVENTORS
GEORGE W. NIEMANN
CHARLES N. SHANNON

By [signature]
ATTORNEY

INVENTORS
GEORGE W. NIEMANN
CHARLES N. SHANNON
By [signature]
ATTORNEY

INVENTORS
GEORGE W. NIEMANN
CHARLES N. SHANNON
By
ATTORNEY

DIGITAL FREQUENCY GENERATOR FOR CODED INTERROGATION

The invention described herein may be manufactured and used by or for the Government of the United States of America for governmental purposes without the payment of any royalties thereon or therefor.

The present invention relates to interrogator signalling systems and more particularly to a dynamic command control system for sonobuoys wherein coded interrogation signals are transmitted to sonobuoys.

The concept of command control for sonobuoy systems is necessary in anti-submarine warfare (ASW) operation to achieve coordinated action in carrying out an overall plan or mission. The two general classes of command control are that of static control, which includes basic training of people, standing instructions, and initial instructions for a specific operation, and that of dynamic control, which permits the mission commander to modify his instructions during the course of a mission to effectively utilize his forces as necessary.

Static control of sonobuoys has been in existence for some time and until the introduction of explosive echo-ranging techniques into the sonobuoy system, these static control techniques were considered quite adequate. This technique required that an explosive sound source be dropped at or near one of the sonobuoys in an echo-ranging pair, a requirement that imposed serious limitations on the system. In particular, it dictated a low information rate and required that the aircraft remain in the immediate vicinity of the sonobuoys. This prevented the aircraft from using magnetic anomaly detection means to assist in the localization and detection of submarines and even after a successful contact, additional target information could no longer be obtained once the aircraft departed from the sonobuoy location.

To overcome this deficiency, the underwater sound source buoys (BUSS) were developed. The BUSS, containing four charges, is dropped alongside one or both sonobuoys of an echo-ranging pair, and the charges are released upon a command signal from the aircraft. This development created the first real requirement for a command control system.

Accordingly, with the advent of the dynamic command control system, there arose a need for greater numbers of sonobuoy channels to handle the increased communications problem. Presently, there are 16 sonobuoy channels which are expected to be increased to 31; however, it appears that more than 31 channels would be required to meet the future needs. To alleviate this problem, one approach has been to incorporate a command "OFF" function in the sonobuoy. This would permit the aircraft to turn off those sonobuoys which are no longer useful (because of their position with respect to the submarine track or some malfunction) so that a new sonobuoy may be planted. This eliminates some of the requirements for additional channels and again places a new requirement in the command control concept.

The general purpose of the present invention is therefore to provide a coded signal system whereby a single radio frequency carrier is modulated with selected two-tone signals from a plurality of discrete tones, whereby relative large numbers of buoys can be operated on a single carrier frequency. To attain this purpose, the present invention employs digital techniques for selecting and generating frequency tones upon receipt of instructions from an operator or a computer.

It is therefore an object of the present invention to provide a novel command control buoy system in which a large number of buoys may be commanded on a single frequency from a remote position, and in which the status of each buoy is displayed, and in which there is a minimum number of interconnections in the system.

Another object of the invention is to provide an improved command control generator which is characterized by high reliability, extremely high frequency stability, simplicity of operation and ease of maintenance.

Other objects and many of the attendant advantages of this invention will be readily appreciated as the same becomes better understood by reference to the following detailed description when considered in connection with the accompanying drawings, in which:

FIG. 1 illustrates a block diagram of the command control panel and generator;

FIG. 2*a* is a partial schematic diagram of the magnetic shift register employed in the command control panel and FIG. 2*b* is a timing diagram of the signals associated therewith;

Briefly, the invention provides a digital frequency generator for generating and transmitting address codes in the form of two-tone signal combinations for controlling BUSS sonobuoys.

Figure 1:
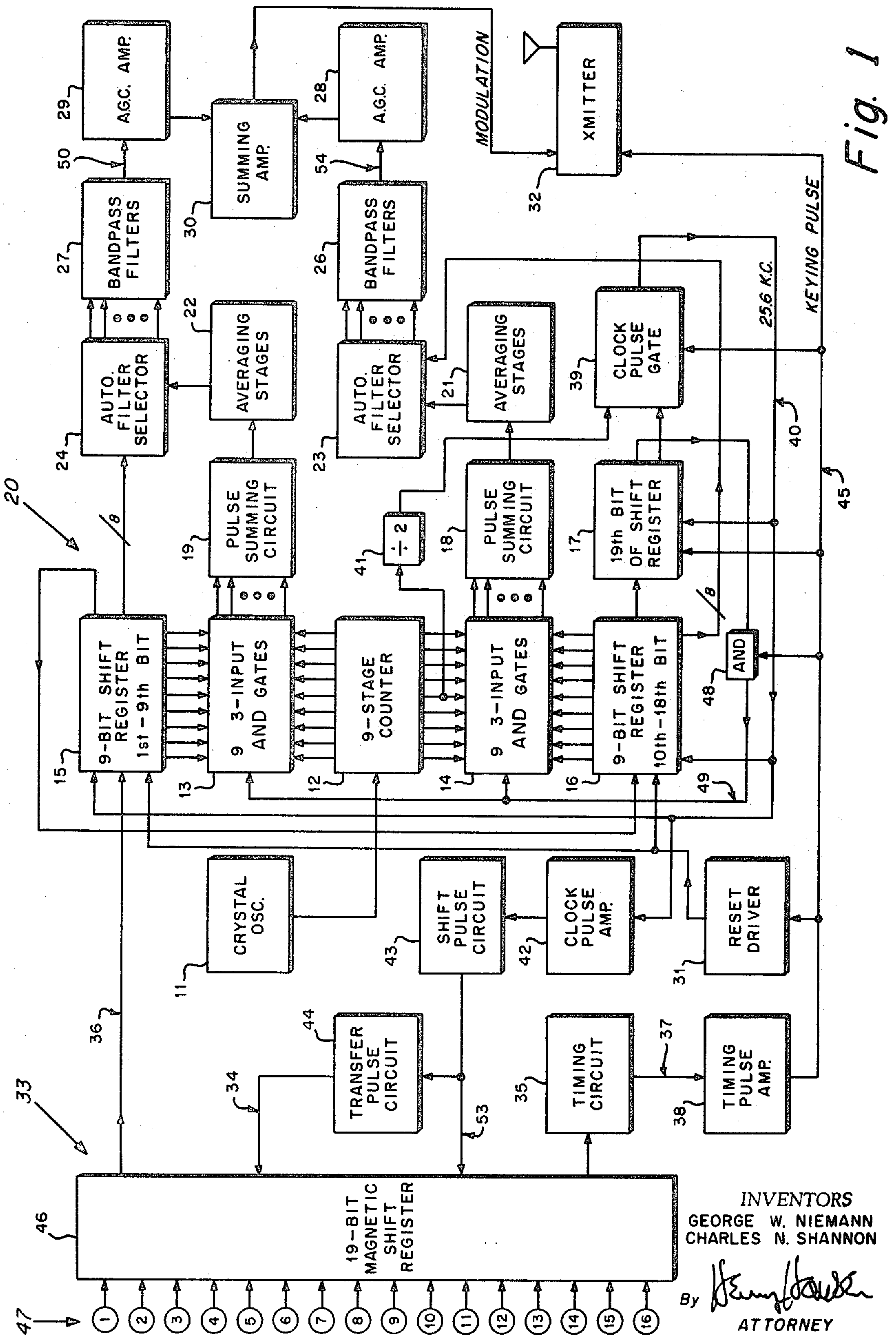

Referring now to the drawing, there is shown in FIG. 1 an embodiment of the invention in which the heart of a command control generator 20 is a crystal controlled oscillator 11 with an output signal frequency of 1.6384 megacycles. This signal is coupled to a nine-stage ripple-through counter 12 comprising nine binary countdown elements which are typically R–S flip-flop/counter networks of the integrated circuit type and are well known to those skilled in the art.

Figure 3:
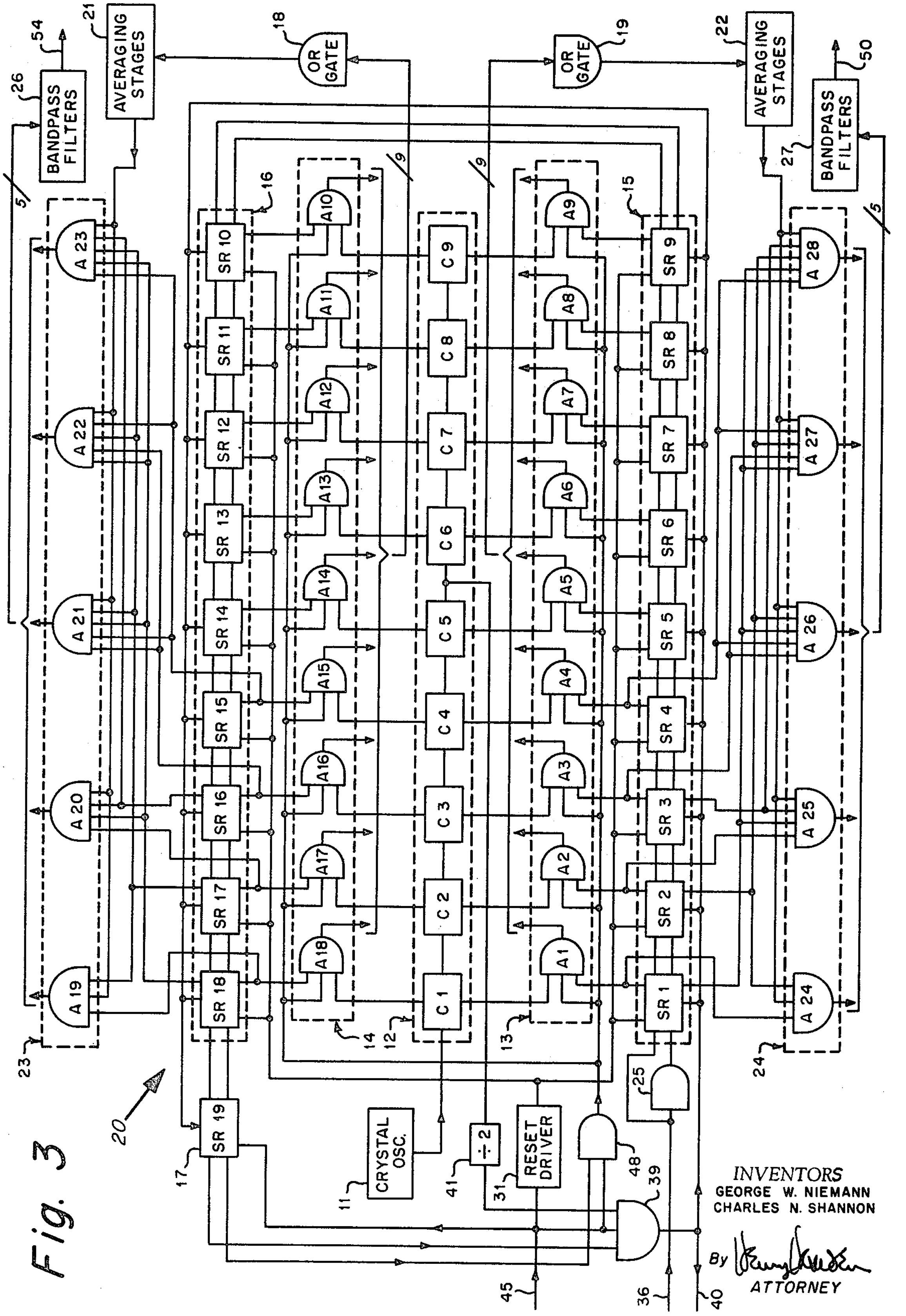
FIG. 3 is a logic diagram of a portion of the command control generator.

The outputs from each binary stage divide the input signal thereto by a factor of two and accordingly with nine binary stages, the oscillator output signal is divided by 512. As shown in FIG. 3, the outputs from each binary stage (C1 through C9) are coupled to one input in each of two sets of nine 3-input AND gates generally referred to by numerals 13 and 14, with each AND gate indicated by A1 through A18.

The other two inputs to the three-input AND gates are derived from a 19-bit shift register comprising two 9-bit sections 15 and 16 and a 1-bit section 17 which are labeled SR1 through SR19. The 19-bit shift register contains coded address information for the two-tone signal that is to be transmitted to the BUSS sonobuoys. The means for selecting the desired code will be discussed later.

The second input to the three-input AND gates is the output from each bit of the shift register and the third input is the output of the 19th bit of the shift register. The outputs of the nine three-input AND gates 13 and 14 are applied to the inputs of two nine-input OR gates 18 and 19 where the signals are summed and then applied to averaging circuits 21 and 22.

The averaging circuits 21 and 22 comprise five divide-by-2 binary elements serially arranged so that the signals appearing at the output of the OR gates 18 and 19 are counted down by a factor of 32. The function of the averaging circuits 21 and 22 is to reduce the irregularity of pulse spacing as a result of summing various signals from a counter to achieve output frequencies not obtainable from the counters directly. The irregularity may be made negligibly small by generating the basic frequency at some multiple of the required frequency and then dividing down to the desired frequency. The irregularity, which has a maximum of one-half the period of the highest frequency summed, is then divided by the factor that has been applied to the basic frequency. In this case, the factor is 32, hence the averaged signal has a negligible amount of irregularity therein.

The averaged signal is then applied to automatic filter selectors 23 and 24 which are controlled by the output signals from the shift registers 15 and 16 as shown in FIG. 3. The filter selectors 23 and 24 each comprise five AND gates A19 through A23 and A24 through A28, respectively. Depending upon the particular code selection, as established by depressing one of the push button selector switches, a particular AND gate in each of the automatic filter selector circuits 23 and 24 is enabled during the time in which a signal is issuing from the averaging circuits 21 and 22, thereby passing the averaged signal to one of the five bandpass filters contained in filter units 26 and 27. The function of the bandpass filters is to convert the square wave output from the filter selector into sine waves of the same frequency with a minimum of harmonic distortion.

Since the bandpass characteristics of the filters are not flat, the output signals therefrom are coupled to A.G.C. amplifiers 28 and 29 (FIG. 1) through conductors 50 and 54 to insure that the amplitude of the signal applied to a summing amplifier 30 remains constant and independent of the filter characteristics. The summing amplifier sums the two signals to produce a two-tone signal for application to a modulator of a transmitter 32. In this way, the transmitted signal will have a two-tone modulation thereon.

The particular two-tone signal which is applied to the transmitter 32 is determined by a command control panel 33 comprising a 19-bit magnetic shift register 46 which is controlled by 16 push button channel selector switches referred to generally by numeral 47 with each switch numbered 1 through 16, a transfer pulse circuit 44, a shift pulse circuit 43, a clock pulse amplifier 42, a timing circuit 35 and a timing pulse amplifier 38. The push button channel selector switches perform two functions; namely, that of selecting the desired code for the command control generator 20 and that of displaying the number of unexpended charges remaining on each sonobuoy. The status display of each switch is accomplished with four lamps (not shown) located in the push button switch. These lamps are turned off sequentially when the button is depressed, thereby indicating that a charge on a particular BUSS sonobuoy has been fired.

The switch mechanism necessary to accomplish the aforementioned status display, is basically a linear-to-rotary converter, where a push of the button causes the rotation of a five-segment contact cam. One segment of the cam is used as a momentary action switch which triggers the firing of the charges. The other four cam segments are internally connected to four individual lamps located behind the face of the push button. As the cam rotates, due to the operation of the push button for firing of the charges, the four lamps are sequentially turned off. The number of lamps remaining on, indicate the number of on expended charges left on each sonobuoy.

Figure 2A:
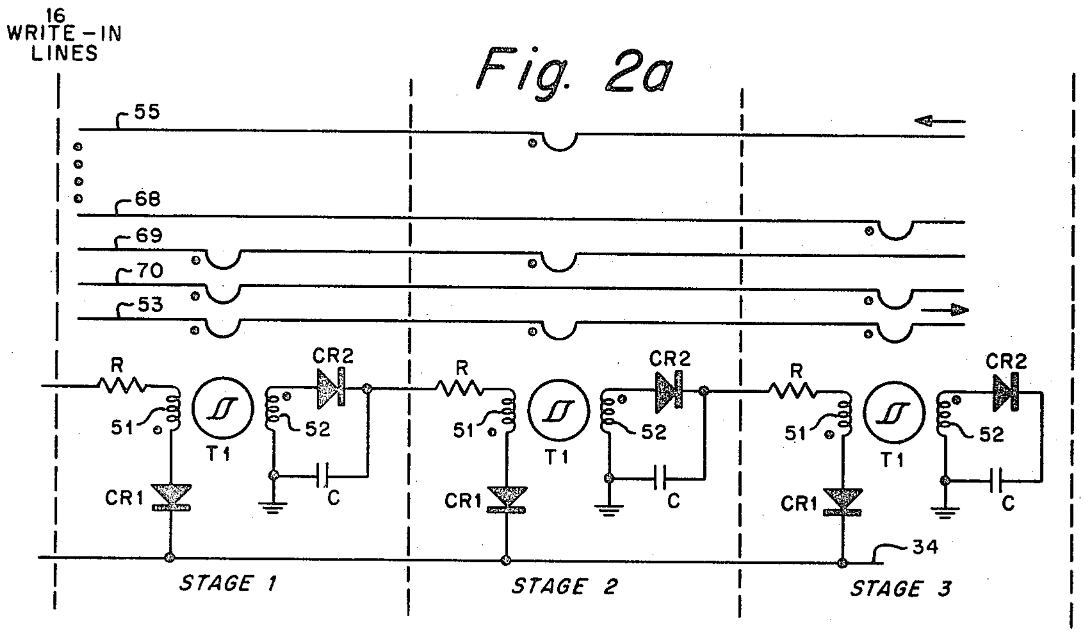

The second function of the push button channel selector switches is that of selecting the desired code in the magnetic shift register 46 so as to achieve a particular two-tone signal. A partial schematic diagram which illustrates three of the nineteen stages in the shift register is shown in FIG. 2*a*. Each state of the register consists of a current limiting resistor R, a transfer diode CR1, a blocking diode CR2, a storage capacitor C, and a magnetic core T1, with an input winding 51, an output winding 52, a shift winding 53, a transfer line 34, 16 write-in windings 55 through 70. Each of the write-in lines 55 through 70 is connected to one of the push button channel selector switches. The write-in lines are magnetically linked (coupled) to particular magnetic cores so as to establish a selected code. For example, write-in line 55 is linked only to the magnetic core of stage 2 whereas write-in line 69 is linked to stages 1 and 2. The shift line 53 is linked to each stage of the magnetic shift register for the reasons to be described hereinafter.

When a push button channel selector switch is energized, current flows through one of the 16 write-in lines and sets the flux to a particular state in the magnetic cores that it links. For purposes of illustration, assume that this particular state is called a "zero" and the opposite state is a "one", then the cores not linked by the write-in winding remain in the one state whereas those which are linked to the write-in winding are set in the zero state.

Figure 2B:
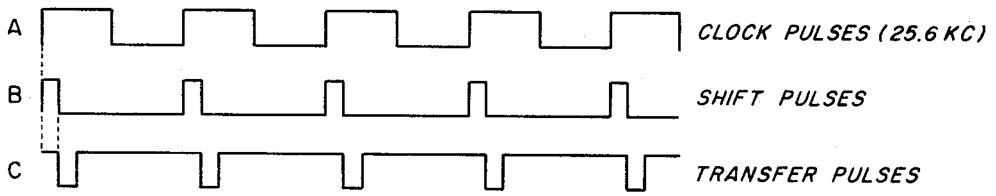

After the word has been written into the 19-bit magnetic shift register 46, the leading edge of a clock pulse illustrated in line A of FIG. 2*b* from the command control generator (to be described hereinafter) initiates shift pulses shown in line B of FIG. 2*b*, which cause the information stored in the magnetic core T1 of each stage to be shifted to the storage capacitor in the same stage. If the core was originally in the zero state, a positive output pulse occurs and this pulse is stored as a charge on capacitor C. If, however, the core was originally in the one state, there is no output pulse and consequently C is not charged.

Assume that a charge has been established on C of stage one as a result of the shift pulses on line 53, then this charge is maintained because blocking diode CR2 is reverse biased and transfer diode CR1 of stage 2 is also reverse biased due to the bias level on a transfer line 34. At the completion of the shift pulse, after the zero (positive signal) is stored on C, the transfer pulse as shown in line C of FIG. 2*b* allows CR1 to conduct thereby allowing C to discharge through the core of the following stage. The current resulting from the capacitor discharge sets the next stage core into the zero state. Thus, the information in the form of a zero in one stage has been transferred in the form of a zero to the next stage in less than the period of the clock pulse, and the 19-bit magnet shift register 46 is now ready for the next shift pulse. If the core in stage one had been in the one state, a one would have been shifted to the next stage because the next stage was already in the one state and there was no charge on C to change it. After 19 clock pulses, all the address information in the register is systematically shifted out and transferred to the command control generator on a single conductor 36.

Stage 19 of the shift register is linked to all the push button selector switches and consequently a zero is set into the 19th stage of the magnetic shift register 46 each time a channel selector button is pushed. The zero in the 19th stage of the magnetic shift register has two functions: first, since the output of the 19th stage is always first to be shifted out of the register, it can be used to trigger the timing circuit 35 to enable the shifting sequence and second, since it is the first pulse to reach SR19, it can be used to stop the shifting sequence in a manner to be described below.

The timing circuit 35 produces an output pulse having a 1-second pulsewidth which is coupled through a conductor 37 to the timing pulse amplifier 38 where the pulse is amplified and applied through a conductor 45 to a clock pulse gate 39, to a reset driver 31, the reset line of the 19th bit of shift register 17, one input of a two-input AND gate 48 and the keying circuit of the transmitter 32. This timing pulse then resets the 19th bit of shift register 17 so that its output which is coupled to input of the clock pulse gate 39 is a one. The reset driver 31 is triggered by the leading edge of the timing pulse and causes SR1 through SR18 to be set in the one state, thereby clearing the registers. The timing pulse also enables the transmitter 32 for a 1-second duration.

The second input to the two-input AND gate 48 is coupled to the output of the 19th bit of shift register 17 so that the output of the AND gate 48 is a gate control signal 49 which enables the A–1 through A–18 during the coincidence of the timing pulse and the output of the 19th bit of shift register 17.

The clock pulse gate 39 is typically a three-input AND gate which upon receiving the timing pulse (which is a one) and the one from the 19th bit of the shift register 17 passes the signal appearing at its third input. This signal is derived from a divide-by-2 stage 41 which has its input coupled to the output of the fifth stage of the ripple-through counter 12. The output of the clock pulse gate 39 will be a train of pulses having a frequency of 25.6 kc since the input to the divide-by-2 stage is 51.2 kc. This signal referred to as the clock pulse output is coupled to the clock pulse amplifier 42 through a conductor 40 and then to the shift pulse circuit 43 which is typically a blocking oscillator having an output duration of approximately 2.8 microseconds as shown in FIG. 2*b* line B. The output of the shift pulse circuit 43 is coupled to the shift line 53 for shifting the pulses on the magnetic cores, T1, from each stage to the storage capacitor C as previously described. The output of the shift pulse circuit 43 is also coupled to the transfer pulse circuit 44 which is typically a blocking oscillator having an output signal with a duration of 4 microseconds as shown in FIG. 2*b* line C. This signal is coupled to the transfer line 34 for transferring the pulse on the storage capacitor C of one stage to the input circuit of the following stage as previously described.

Figure 4:
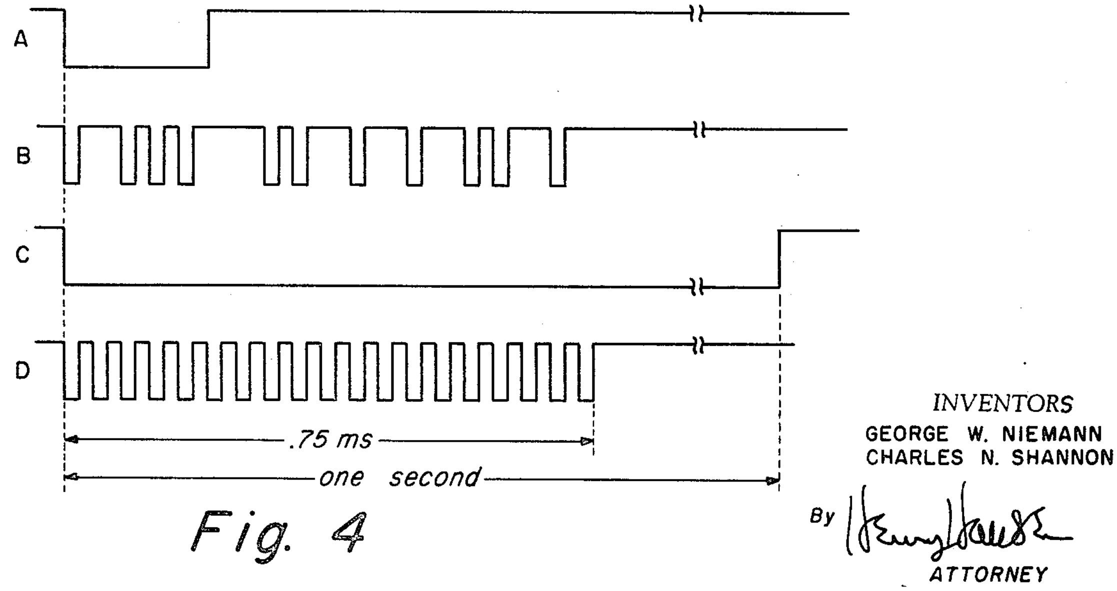
FIG. 4 is a timing diagram of signals associated with the specific embodiment.

The operation of the digital frequency generator will now be described from the instant a push button selector is depressed to the time a two-tone signal is transmitted. Assume that an operator or a computer actuates push button selector switch No. 8 on the command control panel as shown in FIG. 4 line A. As a result thereof, current flows through one of the write-in lines of the magnetic shift register and sets a certain combination of ones and zeros into the 19-bit magnetic shift register as shown in line B of FIG. 4 in which each negative going pulse represents a one and no pulse represents a zero state. The pulse generated upon pushing the push button selector switch, also triggers a timing multivibrator having a one second output pulse as shown in line C of FIG. 4. This one second pulse is amplified by timing pulse amplifier 38 and sent to the command control generator 20 where it is applied to the transmitter as the keying pulse. The amplified pulse is also applied to both SR19 to set its output to a one and to a reset driver 31 which resets 18 stages (SR1 through SR18) of the shift register to the one state. The 1 second pulse is also applied to the clock pulse gate which now passes the 25.6 kc to each stage of the shift register in the command control generator as shown in line *d* of FIG. 4. The output of the clock pulse gate is also applied to the clock pulse amplifier where the leading edge of each pulse triggers the shift pulse circuit which is a 2.8 microsecond blocking oscillator as shown in FIG. 2b, line *b*. This pulse is used in the magnetic core shift register 46 as previously described, to shift the zeros from one core to the storage capacitor. The trailing edge of the output pulses from the shift pulse circuit trigger the transfer pulse circuit 44 which is also a blocking oscillator having a duration of 4.8 microseconds as shown in FIG. 2b line *c*. These pulses, the transfer or advance pulses are used to transfer the zeros stored on the storage capacitor to the core of the next stage.

With each succeeding clock pulse, the information contained in the 19-bit magnetic shift register 46 is transferred to the 19-bit shift register contained in the command control generator 20. The first bit of the address from the command control panel is read into the first stage of the shift register in the command control generator. The trailing edge of the shift pulse moves this bit to the second stage so that the register is now ready for the next bit of the address. This procedure is repeated for each clock pulse until the first bit of the address which was shifted into the command control generator register reaches the 19th stage. At this time, the clock pulse gate is closed since the output line of bit 19 which is coupled to the input of the clock pulse gate reverts to the zero state (since a zero is always set into the 19th bit as previously described), thereby inhibiting the output clock pulse signal.

The output of the 19th bit 17 is AND gated with the timing pulse signal and then coupled to an input of each of the three input AND gates, as illustrated in FIG. 3, and is used as an enabling signal (gate control) for these gates. The other two inputs, as previously described, are coupled to individual stages of the 19-bit shift register and the countdown circuit. Therefore depending upon the state of each bit in the 19-bit shift register and the count-down circuit, either an output will be derived from the AND gates when there is coincidence of the three signals or no output will be derived therefrom. The output signals from these AND gates are then combined in the OR gates and applied to the averaging stages 21 and 22. As described previously, the averaging stages function to eliminate the irregularities existing in the summed signal as a result of the addition of the various frequency signals.

The averaged signals are then applied to the automatic filter selectors 23 and 24 (shown in detail in FIG. 3), which as a function of the selected code, will pass the averaged signals into the appropriate bandpass filters contained in units 26 and 27, thereby converting the square wave averaged signals into sine waves. These signals are then applied to A.G.C. amplifiers 28 and 29 to maintain their output levels constant and independent of the filter characteristics. The output of the A.G.C. amplifier 28 is then combined with the output of the A.G.C. amplifier 29 to provide the two-tone signal which is then applied to the modulator of the transmitter 32.

By this means then, a two-tone signal having the frequencies selected by the push button selector switch is generated and transmitted to the BUSS sonobuoys, only one of which will respond to the transmitted signal. In this manner only a selected BUSS sonobuoy is actuated as a result of one push button selection.

From the foregoing description, it can be seen that only three signal lines connect the command control panel 33 to the command control generator 20: the address line 36, the timing pulse line 45 and the clock pulse line 40. In this way, the number of interconnecting signal lines is minimized and in an aircraft where the weight of interconnecting cables is a very important factor, a significant weight savings has been accomplished.

The command control system described herein is capable of generating a plurality of two-tone frequency combinations in hundred cycle increments merely by actuating an appropriate push button selector. Accordingly, it can be readily appreciated that the need for a large number of sonobuoy communication channels has been eliminated by a novel digital frequency two-tone generator which may be operated from a remote position with a minimum of interconnects and which is characterized by high reliability, extremely high frequency stability, simplicity of operation and ease of maintenance.

Various modifications are contemplated and may obviously be resorted to by those skilled in the art without departing from the spirit and scope of the invention, as hereinafter defined by the appended claims, as only a specific embodiment thereof has been disclosed.

What is claimed is:

1. A command control system for generating a plurality of signal combinations adapted to be connected to a transmitter comprising:
- control means for providing a coded address signal;
- an oscillator having an output signal;
- counter means electrically connected to said oscillator and responsive to said oscillator output signal for providing a plurality of binary signals;
- first register means serially receiving said coded address signal and providing a first plurality of parallel outputs in response to said control means;
- gating means responsive to said plurality of binary signals and said first plurality of parallel outputs for generating said plurality of signals of different frequency;
- first summing means electrically connected to said plurality of signals of different frequency for providing a first summed output signal, said signal being the summation of the individual frequencies of said plurality of signals of different frequency;
- first averaging means electrically coupled to said first summing means and responsive to said first summed output signal for producing a first averaged output signal with substantially no irregularities therein by dividing said first summed output signal by a predetermined factor;
- first filter means operatively connected to said first averaged output signal for providing a substantially sinusoidal signal; and
- amplifier means receiving said sinusoidal signal and providing a modulating signal to the transmitter.

2. A command control system as recited in claim 1 wherein said control means for providing a coded signal comprises:
- selection means for selecting a desired code;
- second register means responsive to said selection means for providing said coded address signal;
- timing means electrically connected to said register means for producing an output timing signal;
- clock gate means responsive to said output timing signal and said counter means for providing clock pulses; and
- electrical means responsive to said clock pulses for transferring said coded address signal to said generator means.

3. A command control system as recited in claim 2 wherein said first register means further comprises:
- means for providing a second plurality of parallel outputs in response to said control means; and a second gating means responsive to said plurality of binary signals and second plurality of parallel outputs for generating a second plurality of signals of differing frequency.

4. A command control system as recited in claim 3 further comprising:

second summing means electrically connected to said second plurality of signals for providing a second summed output signal, said signal being the summation of the individual frequencies of said second plurality of signals of different frequency;

second averaging means electrically coupled to said second summing means and responsive to said second summed output signal for producing a second averaged output signal with substantially no irregularities therein by dividing said second summed output signal by a predetermined factor;

second filter means operatively connected to said second averaging means for providing a second substantially sinusoidal signal; and means coupling said second substantially sinusoidal signal to said amplifier means for providing at the output of said amplifier means a two-tone modulating signal.

5. A command control system as recited in claim 2 wherein said counter means comprises:

a plurality of binary stages serially arranged for providing a plurality of binary signals of differing frequency.

6. A command control system as recited in claim 5 wherein said first register means comprises:

a plurality of binary stages forming a shift register for receiving said coded address signal and providing a plurality of parallel outputs in response to said control means.

7. A command control system as recited in claim 6 wherein said first averaging means comprises:

a plurality of binary stages serially arranged for providing an averaged output signal having a lower frequency than said composite signal and containing substantially no irregularities.

8. A command control system as recited in claim 7 wherein said first filter means comprises:

a plurality of AND gates each having a first input connected to said first averaging means and each having a plurality of other inputs operatively connected to said first register means for providing an output signal; and a plurality of bandpass filters electrically coupled to the outputs of said AND gates for providing a substantially sinusoidal signal for application to said amplifier means.

9. A command control system as recited in claim 8 wherein said second register means comprises:

a plurality of binary stages serially arranged, each stage comprising:

a magnetic core;

input means operatively connected to said core;

output means operatively connected to said core and to the input means of the following stage;

a plurality of write-in lines magnetically coupled to selected ones of said stages for establishing said coded address signal.

10. A command control system as recited in claim 9 wherein said electrical means comprises:

a first blocking oscillator having an input electrically connected to said clock gate means and responsive to said clock pulses for producing shift pulse signals for application to said second register means;

a second blocking oscillator having an input electrically coupled to the output of said first blocking oscillator and responsive to said shift pulse signals for producing transfer pulse signals for application to said second register means, said shift pulse signals and transfer pulse signals causing said coded address signal of said second register means to be transferred to said first register means in response to said clock pulses.

11. A digital frequency generator adapted to be connected to a transmitter for control of sonobuoys from an aircraft comprising:

an oscillator having an output signal;

counter means electrically connected to said oscillator for producing a plurality of binary signals;

control means having a plurality of binary stages for providing a coded address signal;

register means having a plurality of outputs indicative of said coded signal;

timing means operatively connected to said control means for providing an enabling signal;

clock gate means having a first input electrically connected to said enabling signal, a second input operatively connected to said counter means and a third input electrically connected to said register means for providing a clock pulse signal;

means responsive to said clock pulse signal and coupled to said control means for transferring said coded address signal from said control means to said register means;

gating means having a first plurality of inputs connected to said plurality of binary signals and a second plurality of inputs connected to said plurality of outputs from said register means, said gating means providing a plurality of output signals of differing frequency;

summing means operatively connected to said gating means for providing a summed signal, said signal being the summation of the frequencies of said signals of differing frequency;

circuit means electrically connected to said summing means for providing a substantially sinusoidal signal; and amplifier means responsive to said sinusoidal signal for transmissions to the sonobuoys.

12. A digital frequency generator as recited in claim 11 wherein said circuit means comprises:

averaging means electrically connected to said summing means for reducing the irregularities in said summed signal; and filter means responsive to the averaged signal and said register means for selecting a bandpass filter in accordance with said coded address signal, said bandpass filter converting said averaged signal to a substantially sinusoidal signal for application to said amplifier means.

13. A digital frequency generator as recited in claim 12 wherein said counter means comprises:

a plurality of binary stages serially arranged for providing a plurality of binary signals of differing frequency.

14. A command control system as recited in claim 13 wherein said register means comprises:

a plurality of binary stages forming a shift register for receiving said coded address signal and providing a plurality of parallel outputs in response to said control means.

* * * * *